Figure 1:
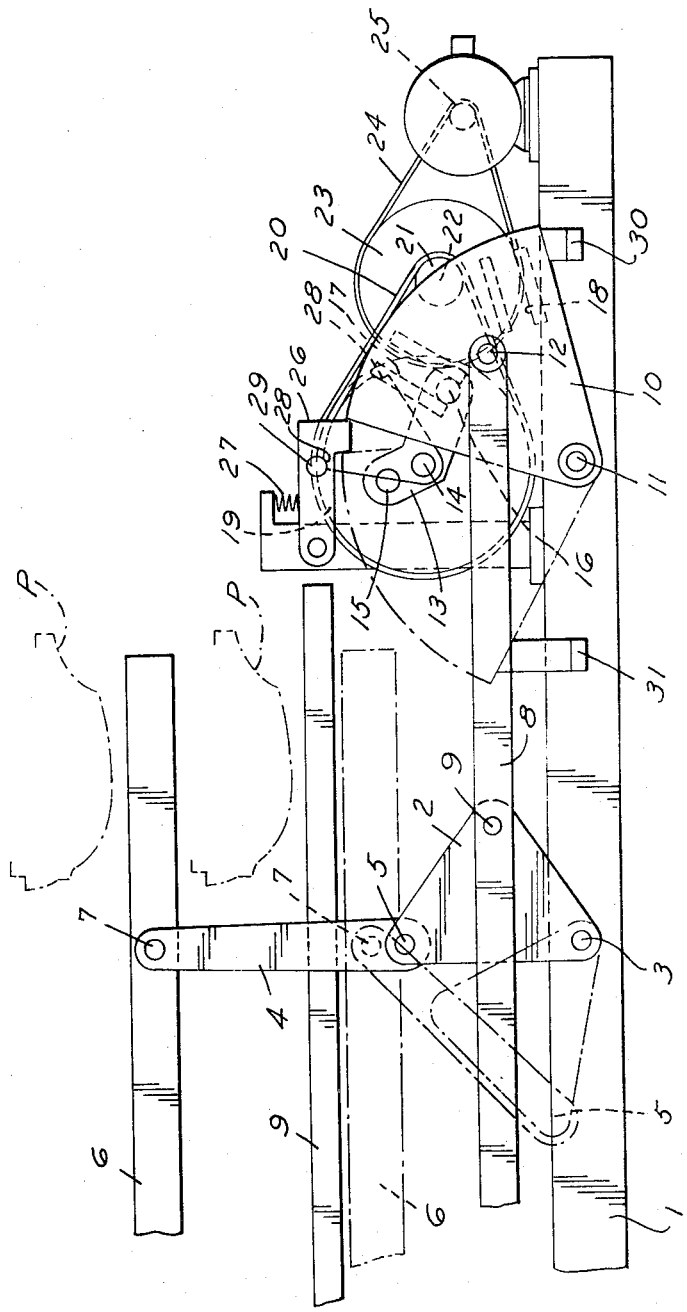

United States Patent

Brems

[15] 3,680,399
[45] Aug. 1, 1972

[54] MULTIPLE STEP INDEXING AND REVERSING DRIVE MECHANISM

[72] Inventor: John H. Brems, 32867 White Oaks Trail, Birmingham, Mich. 48010

[22] Filed: June 22, 1970

[21] Appl. No.: 48,374

[52] U.S. Cl. .................................. 74/89, 74/436
[51] Int. Cl. .............................. F16h 27/02
[58] Field of Search ................... 74/89, 88, 436

[56] References Cited

UNITED STATES PATENTS

| | | | |
|---|---|---|---|
| 2,512,894 | 6/1950 | Gieskieng | 74/436 |
| 3,552,061 | 1/1971 | Hermann | 74/89 |
| 3,396,856 | 8/1968 | Diepeveen | 74/89 |
| 3,361,005 | 1/1968 | Carpenter | 74/436 |

*Primary Examiner*—William F. O'Dea
*Assistant Examiner*—Wesley S. Ratliff, Jr.
*Attorney*—Barnes, Kisselle, Raisch & Choate

[57] ABSTRACT

A multiple step indexing and reversing drive mechanism to provide shock free starting and stopping with a reduced velocity section intermediate multiple velocity peaks for use, for example, in transfer mechanisms for lifting parts to and lowering parts from a work station which includes an acceleration and velocity control device incorporating spaced drive pins revolving on a common axis and positioned to enter and leave respective slots on a follower plate, these slots being disposed on lines which converge at a point near but spaced from an axis of rotation of the follower plate, the angles of the slots being related mathematically to effect the desired acceleration and velocity characteristics.

6 Claims, 10 Drawing Figures

INVENTOR
JOHN H. BREMS
BY
Barnes, Kisselle, Raisch & Choate
ATTORNEYS

ENTRANCE ROLLER A
INTO SLOT A
(BEGINNING OF MOVEMENT)

EXIT ROLLER A
FROM SLOT A
(INTERCHANGE)

ENTRANCE ROLLER B
INTO SLOT B
(INTERCHANGE)

EXIT ROLLER B
FROM SLOT B
(END OF MOVEMENT)

INVENTOR
JOHN H. BREMS
BY
Barnes, Kisselle, Raisch & Choate
ATTORNEYS

MULTIPLE STEP INDEXING AND REVERSING DRIVE MECHANISM

This invention relates to a multiple step indexing and reversing drive mechanism.

It is an object of this invention to provide a smooth shock free starting and stopping mechanism which has two velocity peaks, one on either side of a reduced velocity section at or near the center of travel of an indexing member which moves in a circular path, a straight line, or defined curvilinear motion.

It is an object to provide a mechanical system in which the magnitude of the reduced velocity generated near the mid-point of travel may be adjusted by suitable design parameters.

It is a further object to provide a mechanism in which the position where the reduced velocity is reached can be adjusted over a considerable range.

It is a further object to provide an accelerating device in which the motor and primary drive system is permitted to reach its operating speed before it encounters the load of the indexing mass; similarly, the same device will decelerate the indexing mass to zero before the motor brake is engaged thereby relieving these mechanisms of any great stopping loads.

It is a further object to provide a device which permits considerable overtravel of the primary drive source at either end of the stroke without effecting the precise stopping point of the output member.

It is a further object to provide a mechanical locking system which is automatically engaged at each end of the stroke.

Other objects and features of this invention relating to the details of construction and operation will be apparent in the following descriptions and claims.

DRAWINGS accompany the disclosure and the various views thereof may be briefly described as follows:

FIG. 1, a side elevation of the device showing the parts in their relative operating positions.

FIGS. 2 to 6, a group of five schematic sketches which by simple line drawings, illustrate the progression of movement through a typical index cycle.

FIGS. 7 to 10, a group of diagrams illustrating the mathematical relationship of the drive mechanism.

In the field of automatic workpiece handling and transferring, many applications arise in which it is necessary for the transferring device to move through some distance from a starting point, where it had been stationary, to a point where it engages or picks up the workpiece, and then moves the workpiece to some new position along a line essentially continuous with its original movement path.

In such applications, it is desirable for the transferring device to move from its stopped and retracted position to the workpiece pick-up position as quickly as possible, and subsequently to move the workpiece from the pick-up position to its final position as quickly as possible. On the other hand, it is also desirable that the transferring device move relatively slowly during the instant that it is contacting the workpiece. Conventional mechanical systems employing acceleration and deceleration at the beginning and end of the overall stroke would be at or near their maximum velocity in the vicinity of mid-stroke. The mechanism described herein incorporates both desirable characteristics, i.e., it accelerates smoothly from its initial stopped position up to a maximum speed, then decelerates smoothly to a predetermined minimum speed, (at which point contact with the workpiece is made) then reaccelerates to a second maximum speed and finally decelerates smoothly to a stop.

It will be understood that this type of application is by way of illustration only and is not restrictive on the use of this mechanism. The mechanism is equally suitable for other applications in which it is desired to employ its characteristics.

REFERRING TO THE DRAWINGS

A machine base 1 carries multiple pairs of lower toggle links 2 which are connected to the base 1 by pivot shafts 3. Each lower toggle link 2 carries upper toggle links 4 which is connected thereto by pivot pin 5. The upper end of each upper toggle link 4 supports a lifter rail 6 through pivot pin 7. Guides are provided for the lifter rails 6 which cause them to move in a near vertical path; these are not shown.

It will be understood that the lifter rails 6 and base 1 are not shown in their entirety nor are the multiple sets of toggles links 2 and 4 which are used to lift the lifter rails 6 upward from base 1. The lower toggle links 2 are all connected and driven together by drawbars 8 which drive all lower toggle links 2 in unison.

Transfer rails 9 are used to transfer the workpieces P from one station to the next; these stations are spaced at equal intervals along the line of travel. The drive mechanism and supports for these transfer rails 9 are not shown. The interrelationship between the lift rails 6 and transfer rails 9 is as follows: When the lift rails 6 are in their down position, the workpieces are supported by suitable locators mounted on the transfer rails 9. In this position the workpieces are carried horizontally forward by the transfer rails 9 through a distance equal to the distance between adjacent stations. At the completion of a forward stroke of the transfer rails 9, the lift rails 6 move upward. At approximately midstroke of this lift movement, suitable locators mounted on the lift rails 6 engage the workpieces and lift them out of the transfer rail locators and carry them upward to a position in which the working operations are performed.

With the workpieces now supported by the lift rails 6, they are clear of the transfer rails 9, and the transfer rails 9 return empty. After the completion of the retraction of the transfer rails 9, and after the completion of the operations being performed in the various stations along the line, the lift rails 6 descend carrying the workpieces. Approximately midway through the downstroke of the lift rails 6, the workpieces are redeposited on the transfer rail locators, and the lift rails 6 continue downward to generate adequate clearance for the subsequent forward stroke of the transfer rails 9 now again carrying the workpieces.

This basic type of rail system is in common usage incorporating a variety of drive and lift systems. It will be seen that since the interchange of workpieces between the transfer rail locators and lift rail locators always takes place near the mid-stroke of the lift rails 6, the interchange takes place at or near the point of maximum velocity, unless a mechanism of the type described herein is employed to drive the lift rails 6. Using conventional lift mechanisms, the interchange occasions considerable shock to the workpieces. This at times causes sufficient workpiece bounce to cause mislocation and even jamming of the workpiece.

The novel mechanism described below which actuates the drawbars 8 provides a rapid movement during the interval that the lift rails 6 move from their lower position to near the interchange point, slows the lift rails 6 down significantly as they move through the interchange, and then moves them at higher speed again from there to their final up position where they are smoothly decelerated to a complete stop.

This mechanism consists of two follower sectors 10, which are pivot connected to the base 1 through shaft 11. The drawbars 8 are connected to the follower sectors 10 by pins 12. The follower sectors 10 in turn are driven by the drive plates 13 mounted on shaft 14. Each drive plate 13 carries two rollers 15 and 16, mounted therein through suitable bearings. Roller 15 engages slot 18 and roller 16 engages slot 17 in the sector follower 10 to accomplish the desired driving effect (exact kinematics are described below). Shaft 14 is driven by sprocket 19 mounted thereon. Sprocket 19 in turn is driven by chain 20 from sprocket 21, which in turn is driven by pulley 23, through shaft 22, on which both are mounted. Pulley 23 is driven by belt 24 from pulley 25 mounted on the output shaft of the motor M.

At the end of the up movement, the sector follower 10 comes to a smoothly decelerated complete stop just as roller 16 reaches the end of slot 17. Any slight overtravel, as is practically necessary, causes roller 16 to move out of slot 17, disengaging the sector follower 10 from the driver plate 13. To prevent any free movement of the sector follower 10, a lock pawl 26 engages the rear face of the sector follower 10. This lock pawl 26 is brought in by a spring 27, having been held out of lock engagement by cam 28 engaging roller 29 mounted on the side of the lock pawl 26. The cam 28 is mounted on shaft 14 and is phased to drop the lock pawl 26 into its lock position just as roller 16 disengages from slot 17 at the end of the stroke. A positive stop 30 prevents the sector follower 10 from overtravel in the forward direction. Therefore, at the end of the up stroke, the sector follower 10 is trapped between stop 30 and lock pawl 26.

At the other end of the stroke, the same lock pawl 26 traps the sector follower 10 between itself and the down stop 31. The lock pawl 26 is again controlled by cam 28. Since 14 makes in excess of one revolution during one cycle, it will be noted that cam 28 will also lower the lock pawl 26 for an interval during the middle of the stroke. During this interval, the lower face of the lock pawl 26 contracts the outer edge of the sector follower 10 and slides thereon until the lock pawl is again controlled through roller 29 by cam 28.

At the beginning of a movement in either direction, the cam 28 contacts the roller 29 and lifts the lock pawl 26 upward out of its locked position just as the appropriate roller engages its slot to start the movement.

Figure 2:
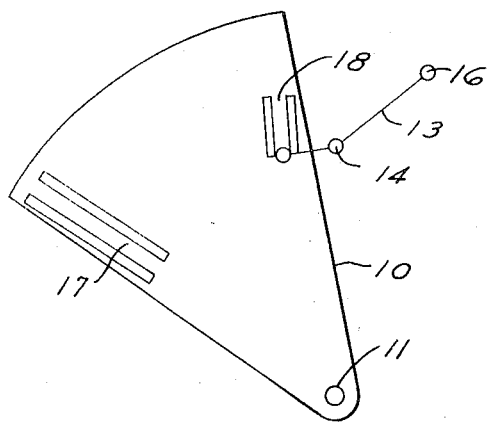

The kinematics of motion can be explained most easily through reference to FIG. 2.

FIG. 2 shows the mechanism at the instant that movement of the sector follower 10 is beginning in the clockwise direction. Roller 15 is just entering slot 18. At this point the driver plate 13 is rotating clockwise at some nominally constant angular velocity $W$. The entry angle of the roller 15 is exactly along the centerline of the slot 18 and the angular velocity of the sector follower 10 is zero.

As the rotation of the driver plate 13 continues in the clockwise direction, the roller 15 moves upward in the slot 18 thereby accelerating the sector follower 10 in a clockwise direction.

Figure 3:
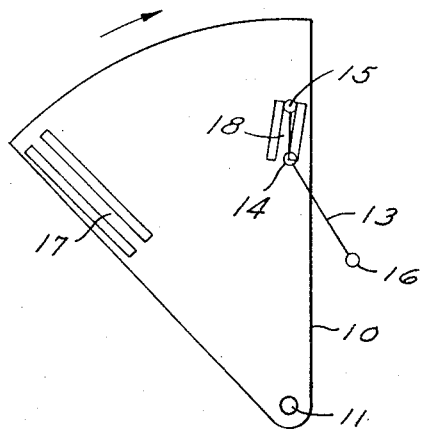

An intermediate maximum angular velocity of the sector follower 10 is reached when roller 15 extends the maximum distance into slot 18 as shown in FIG. 3. The continuing rotation of the driver plate 13 causes roller 15 to start moving outward from slot 18 which causes the sector follower 10 to decelerate, though it is still rotating in the clockwise direction.

Figure 4:
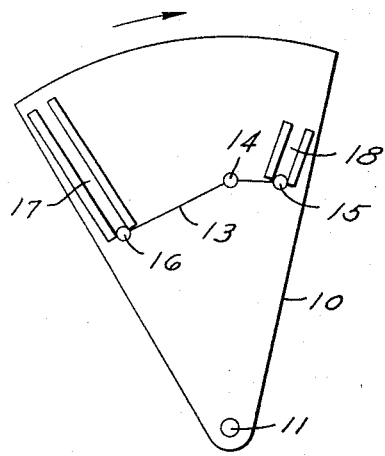

When roller 15 reaches the exit of slot 18, the sector follower 10 has decelerated to some intermediate velocity as shown in FIG. 4. At this time the sector follower has rotated through its initial selected index angle. It should be noted that the slot 15 (and slot 17) are not positioned along radial lines from the center of rotation of the sector follower 10. It is this inclination to the radial lines which determines the magnitude of the intermediate minimum angular velocity of the sector follower 10. The inclination of one slot is determined to achieve a desired intermediate minimum velocity. The inclination of the other slot must then be precisely calculated such that the velocity generated by roller 15 in slot 18 is precisely identical with the velocity generated by roller 16 in slot 17 at that point where both rollers are both engaged in their respective slots.

As the clockwise rotation of the driver plate 13 continues, roller 15 exits from slot 18 and roller 16 moves into slot 17. Roller 16 reaccelerates the sector follower 10 in a clockwise direction and the velocity of the sector follower 10 increases until the roller 16 reaches its maximum penetration into slot 17.

Figure 5:
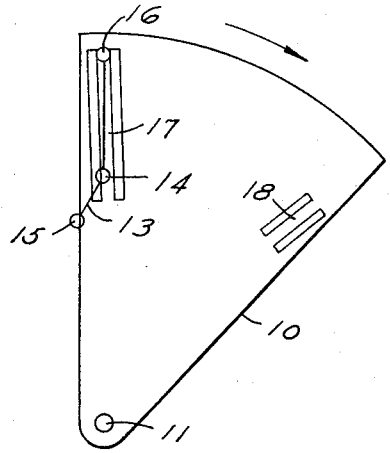

At this point as shown in FIG. 5, the sector follower 10 reaches its second maximum angular velocity which is not necessarily identical with the amplitude of the first maximum angular velocity. These are independently controllable by the relative distances from the center of rotation of the driver plate 13 to the two rollers 15 and 17.

As the rotation of the driver plate 13 continues still further in the clockwise direction, roller 16 starts moving out of slot 17 causing the sector follower 10 to decelerate from the second maximum velocity reached.

Figure 6:
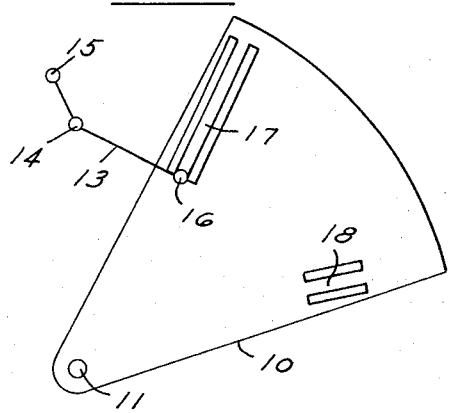

It is smoothly decelerated to a complete stop as roller 16 reaches the end of slot 17. This is shown in FIG. 6. It should be noted that at the instant of exit, the roller is moving along a line coincident with the centerline of the slot 17. At this time the sector follower has rotated through its second selected index angle.

As roller 16 exits from slot 17, the lock pawl (not shown in the kinematic drawings) drops into place locking the sector follower 10 in its final stopped position. The motor, pulley sprocket drive system is stopped by a suitable brake. The stopping point is not critical because the sector follower 10 is already accurately positioned and stopped.

For the reverse stroke the motor is reversed using normal electrical techniques. The drive plate 13 now rotates counterclockwise and will have reached its nominal operating speed before the roller 16 engages slot 17. As the roller 16 enters slot 17, the cam 28 disengages the lock pawl 26 and the sector follower 10 is accelerated in the counterclockwise direction.

The remainder of the return cycle is the exact inverse of the clockwise cycle described above. At the end of the return cycle the sector follower 10 is smoothly decelerated to a complete stop as roller 15 reaches the end of slot 18 and the lock pawl again drops into position locking the sector follower 10 in its returned position. The brake stops the primary drive system whose exact stopping position is again non-critical.

In the application shown, the sector follower 10 is a pivoted member that drives the output system through the drawbars 8. This technique can also be applied to a system where the follower is not supported from a simple pivot, but instead is a member mounted on a slide which therefore moves in a straight line, or is a member that is part of a four bar linkage and therefore moves in a known curvilinear motion.

In such applications, just as in the pivoted type follower system described, the roller to slot geometry must be such that at the ends of the stroke, the roller velocity vector must coincide with the centerline of its stationary mating slot, whereas at the interchange, which is the point of intermediate minimum velocity of the output member, the velocity generated by one roller as it leaves its mating slot must be identical with the velocity generated by the other roller as it enters its mating slot.

The relationship of the angles of the slots and the velocities can be understood by reference to FIGS. 7 to 10.

Figure 7:
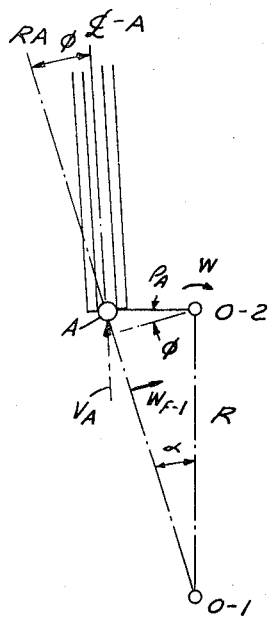

First, with reference to FIG. 7, at the beginning of motion roller A (roller 15 in FIG. 1) enters slot A (slot 18 in FIG. 1). In order to have velocity of follower equal zero, the velocity of the roller A, $V_A$, relative to slot A (when stationary) must be zero, i.e., the radius $\rho_A$ (from the center of roller plate rotation, 0-2, to $\Sigma$ roller A) must be perpendicular to the $\Sigma$ of slot A. Slot A is inclined at a slight angle $\phi$ from a true radial line, $R_A$, from the center of rotation, 0-1, of the follower plate. Therefore, the angle between the radius $\rho_A$ and the perpendicular to the radial line $R_A$ is also $\phi$.

Figure 10:
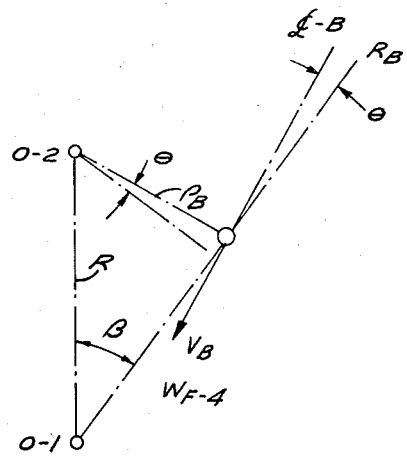

Secondly, if reference is made to FIG. 10, the exit of roller B (roller 16 in FIG. 1) from slot B (slot 17 in FIG. 1) is analagous to the entrance of roller A into slot A. In order to have the velocity of the follower plate equal zero, the velocity of the roller B relative to slot B (when stationary) must be zero, i.e., the radius $\rho_B$ (from the center of roller plate rotation, 0-2, to $\Sigma$ roller B) must be perpendicular to the $\Sigma$ of slot B. Slot B is inclined at a slight angle $\theta$ from a true radial line, $R_B$, from the center of rotation, 0-1, of the follower plate. Therefore, the angle between the radius $\rho_B$ and the perpendicular to the radial line $R_B$ is also $\theta$.

Figure 8:
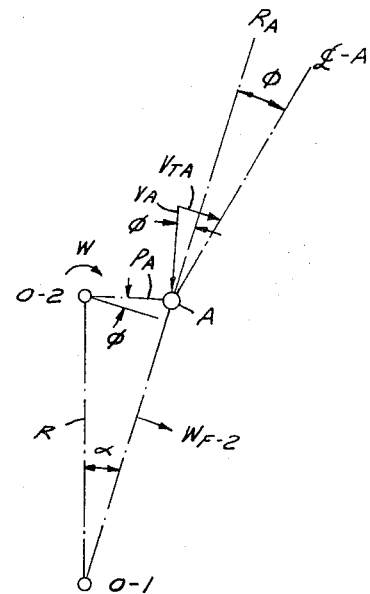

Thirdly, in FIG. 8, there is illustrated the mathematics of the exit of roller A from slot A. Since the distance from the inboard end of the slot A to the center of rotation 0-1 is a constant, the angle between $\rho_A$ and the perpendicular to the radial line $R_A$ is again $\phi$ at the instant of exit of roller A from slot A. Therefore, the velocity vector of roller A also is at an angle $\phi$ relative to the radial line $R_A$ but in the opposite direction from the angle $\phi$ between the slot A and the radial line $R_A$. Therefore, the velocity component of $V_A$ causing rotation of the follower plate at the instant of interchange is $$V_{TA} = V_A\, 2 \sin \phi$$

$$V_A = \omega \rho_A$$

$$V_{TA} = 2\omega \rho_A \sin \phi$$

The distance from the center of rotation, 0-1, of the follower plate to the end of the slot (where the linear velocity is $V_{TA}$) is $$R \cos \alpha + \rho_A \sin \phi$$

Therefore, the angular velocity of the follower plate due to roller A at the instant of interchange is $$\omega_{F-2} = \frac{V_{TA}}{R \cos \alpha + \rho_A \sin \phi}$$

$$\omega_{F-2} = \frac{2\omega \rho_A \sin \phi}{R \cos \alpha + \rho_A \sin \phi}$$

but $$\rho_A = \frac{R \sin \alpha}{\cos \phi}$$

$$\therefore \omega_{F-2} = \frac{2\omega \dfrac{R \sin \alpha}{\cos \phi} \sin \phi}{R \cos \alpha + \dfrac{R \sin \alpha}{\cos \phi} \sin \phi}$$

$$\omega_{F-2} = \frac{2\omega R \sin \alpha \tan \phi}{R \cos \alpha + R \sin \alpha \tan \phi}$$

$$\omega_{F-2} = \frac{2\omega \tan \alpha \tan \phi}{1 + \tan \alpha \tan \phi}$$

Figure 9:
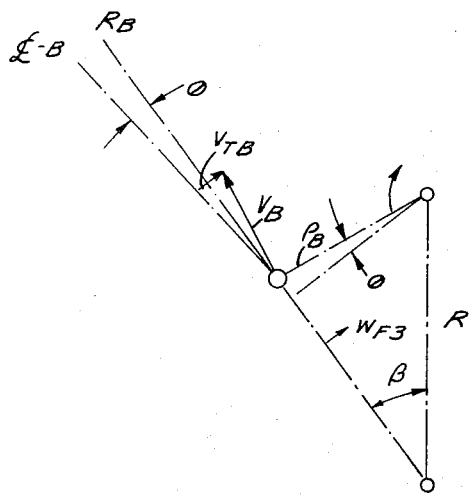

Similarly with reference to FIG. 9, by a process completely analagous to the analysis made with FIG. 8, it can be shown due to the roller B (roller 16 in FIG. 1) entry into slot B (slot 17 in FIG. 1), at the instant of entry (interchange) is $$\omega_{F-3} = \frac{2\omega \tan \beta \tan \theta}{1 + \tan \beta \tan \theta}$$

At the point of interchange, the angular velocity generated by roller A in slot A must equal the angular velocity generated by roller B in slot B, i.e., $$\omega_{F-2} = \omega_{F-3}$$

$$\therefore \frac{2\omega \tan \alpha \tan \phi}{1 + \tan \alpha \tan \phi} = \frac{2\omega \tan \beta \tan \theta}{1 + \tan \beta \tan \theta}$$

$$\frac{1 + \tan \alpha \tan \phi}{\tan \alpha \tan \phi} = \frac{1 + \tan \beta \tan \theta}{\tan \beta \tan \theta}$$

$$\frac{1}{\tan \alpha \tan \phi} + 1 = \frac{1}{\tan \beta \tan \theta} + 1$$

$$\tan \alpha \tan \phi = \tan \beta \tan \theta$$

Therefore $$\tan \phi = \frac{\tan \beta}{\tan \alpha} \tan \theta$$

or $$\tan \theta = \frac{\tan \alpha}{\tan \beta} \tan \phi$$

For a given application, the desired index angles, $2\alpha$ and $2\beta$, will be known from the index requirements, either $\theta$ or $\phi$ may then be chosen, again according to the interchange velocity desired, but once either $\theta$ or $\phi$ is established, the other must meet the requirements of the above equations.

I claim:

1. A multiple step indexing and reversing drive mechanism to provide shock free starting and stopping with a reduced velocity section intermediate multiple velocity peaks which comprises:
   a. a load actuator,
   b. a prime mover for driving said actuator, and
   c. means interposed in a power chain between said actuator and said prime mover comprising:
      1. a follower plate operatively associated with said actuator mounted for pivotal motion about a pivotal axis,
      2. a means forming a plurality of slots on said follower plate extending at angles to each other, the center lines of each being non-radial to and converging at a point spaced from said axis and disposed each at a different angle to a radius from said axis,
      3. a rotating drive means having an axis of rotation arranged to be driven by said prime mover positioned adjacent said follower plate,
      4. drive pins on said drive means spaced from each other and from said axis of rotation, each drive pin being disposed at a different radial distance from said axis of rotation, said drive pins being positioned respectively to enter and leave said respective slots upon rotation of said drive means to effect a control cycle of acceleration, deceleration, acceleration, deceleration in a forward cycle and a similar control cycle in a reverse cycle.

2. A multiple step indexing and reversing drive mechanism to provide shock free starting and stopping with a reduced velocity section intermediate multiple velocity peaks which comprises:
   a. a load actuator,
   b. a prime mover for driving said actuator, and
   c. means interposed in a power chain between said actuator and said prime mover comprising:
      1. a follower plate operatively associated with said actuator mounted for oscillation through a selected distance,
      2. a means forming a plurality of slots on said follower plate extending at angles to each other non-perpendicular to the direction of oscillation and each at a different angle to the direction of oscillation,
      3. a rotating drive means having an axis of rotation arranged to be driven by said prime mover positioned adjacent said follower plate,
      4. drive pins on said drive means spaced from each other and from said axis of rotation, each drive pin being disposed at a different radial distance from said axis of rotation, said drive pins being positioned respectively to enter and leave said respective slots upon rotation of said drive means to effect a control cycle of acceleration, deceleration, acceleration, deceleration in a forward cycle, and a similar control cycle in a reverse cycle.

3. A multiple step indexing and reversing drive mechanism to provide shock free starting and stopping with a reduced velocity section intermediate multiple velocity peaks which comprises:
   a. a load actuator,
   b. a prime mover for driving said actuator,
   c. means interposed in a power chain between said actuator and said prime mover comprising:
      1. a follower plate operatively associated with said actuator mounted for pivotal motion about a pivotal axis,
      2. a means forming a plurality of slots on said follower plate extending at angles to each other, the center lines of each being non-radial to and converging at a point spaced from said axis,
      3. a rotating drive means having an axis of rotation arranged to be driven by said prime mover positioned adjacent said follower plate,
      4. drive pins on said drive means spaced from each other and from said axis of rotation, said driven pins being positioned respectively to enter and leave said respective slots upon rotation of said drive means to effect a control cycle of acceleration, deceleration, acceleration, deceleration in a forward cycle and a similar control cycle in a reverse cycle, the load actuator comprising a support and a toggle plate, the plate being pivoted on the support at one point and being pivoted to said load actuator at another point, and
   d. an actuator link pivoted to said toggle plate between said points to cause movement of said plate on said support.

4. A multiple step indexing and reversing drive mechanism to provide shock free starting and stopping with a reduced velocity section intermediate multiple velocity peaks which comprises:
   a. a load actuator,
   b. a prime mover for driving said actuator, and
   c. means interposed in a power chain between said actuator and said prime mover comprising:
      1. a follower plate operatively associated with said actuator mounted for pivotal motion about a pivotal axis,
      2. a means forming a plurality of slots on said follower plate extending at angles to each other, the center lines of each being non-radial to and converging at a point spaced from said axis,
      3. a rotating drive means having an axis of rotation arranged to be driven by said prime mover positioned adjacent said follower plate,
      4. drive pins on said drive means spaced from each other and from said axis of rotation, said drive pins being positioned respectively to enter and leave said respective slots upon rotation of said drive means to effect a control cycle of acceleration, deceleration, acceleration, deceleration in a forward cycle and a similar control cycle in a reverse cycle, a locking means being provided to mechanically engage said follower plate at the extremities of its motion and means on said rotating drive means to disengage said locking means upon entry of one of said drive pins into one of said slots.

5. A multiple step indexing and reversing drive mechanism to provide shock free starting and stopping with a reduced velocity section intermediate multiple velocity peaks which comprises:
  a. a load actuator,
  b. a prime mover for driving said actuator,
  c. means interposed in a power chain between said actuator and said prime mover comprising:
     1. a follower plate operatively associated with said actuator mounted for pivotal motion about a pivotal axis,
     2. a means forming a plurality of slots on said follower plate extending at angles to each other, the center lines of each being non-radial to and converging at a point spaced from said axis,
     3. a rotating drive means having an axis of rotation arranged to be driven by said prime mover positioned adjacent said follower plate,
     4. drive pins on said drive means spaced from each other and from said axis of rotation, said drive pins being positioned respectively to enter and leave said respective slots upon rotation of said drive means to effect a control cycle of acceleration, deceleration, acceleration, deceleration in a forward cycle and a similar control cycle in a reverse cycle, said follower plate being in the form of a circular segment having radial edges,
  d. a locking means to mechanically engage said follower plate at the extremities of its motion comprising a latch ride on the arcuate portion of each segment and to engage each segmental edge at the extreme motion in each direction, and
  e. means on said rotating drive means to disengage said latch upon the entry of one of said drive pins into one of said slots.

6. A multiple step indexing and reversing drive mechanism to provide shock free starting and stopping with a reduced velocity section intermediate multiple velocity peaks which comprises:
  a. a load actuator,
  b. a prime mover for driving said actuator, and
  c. means interposed in a power chain between said actuator and said prime mover comprising:
     1. a follower plate operatively associated with said actuator mounted for pivotal motion about a pivotal axis,
     2. a means forming a plurality of slots on said follower plate extending at angles to each other, the center lines of each being non-radial to and converging at a point spaced from said axis,
     3. a rotating drive means having an axis of rotation arranged to be driven by said prime mover positioned adjacent said follower plate,
     4. drive pins on said drive means spaced from each other and from said axis of rotation, said drive pins being positioned respectively to enter and leave said respective slots upon rotation of said drive means to effect a control cycle of acceleration, deceleration, acceleration, deceleration in a forward cycle and a similar control cycle in a reverse cycle, the slots on said follower plate being related by the formula $$\tan \theta = \frac{\tan \alpha}{\tan \beta} \tan \phi$$

where $\phi$ is the angle of a first slot with a radial line from the center of rotation of the follower passing through the entrance to said slot, $\alpha$ is one-half the selected initial index angle, $\theta$ is the angle of the second slot to a radial line from the center of rotation of the follower passing through the entrance to said second slot, and $\beta$ is one-half the selected second index angle.

* * * * *

PO-1050
(5/69)

UNITED STATES PATENT OFFICE
CERTIFICATE OF CORRECTION

Patent No. 3,680,399      Dated August 1, 1972

Inventor(s) John H. Brems

It is certified that error appears in the above-identified patent and that said Letters Patent are hereby corrected as shown below:

Column 5, lines 37, 38, 49, 50, change $\leq$ to $\mathcal{C}$

Column 8, line 20, change "driven" to -- drive --.

Signed and sealed this 26th day of December 1972.

(SEAL)
Attest:

EDWARD M. FLETCHER, JR.            ROBERT GOTTSCHALK
Attesting Officer                    Commissioner of Patents